US007945907B2

(12) United States Patent
Dreiling et al.

(10) Patent No.: US 7,945,907 B2
(45) Date of Patent: May 17, 2011

(54) SYSTEM AND METHOD FOR CONFIGURING APPLICATION PROGRAMS

(75) Inventors: Alexander Dreiling, Kelvin Grove (AU); Michael Rosemann, Windsor (AU)

(73) Assignee: SAP AG, Walldorf (DE)

( * ) Notice: Subject to any disclaimer, the term of this patent is extended or adjusted under 35 U.S.C. 154(b) by 1372 days.

(21) Appl. No.: 11/424,193

(22) Filed: Jun. 14, 2006

(65) Prior Publication Data

US 2007/0294244 A1   Dec. 20, 2007

(51) Int. Cl.
   *G06F 9/45* (2006.01)
(52) U.S. Cl. .................................................. 717/168
(58) Field of Classification Search .................... 717/168
   See application file for complete search history.

(56) References Cited

U.S. PATENT DOCUMENTS

| | | | | |
|---|---|---|---|---|
| 6,094,600 | A * | 7/2000 | Sharpe et al. | 700/19 |
| 7,739,517 | B2 * | 6/2010 | Sahita et al. | 713/193 |
| 2002/0026572 | A1 * | 2/2002 | Joory | 713/100 |
| 2002/0055991 | A1 * | 5/2002 | Arrouye et al. | 709/220 |
| 2003/0101245 | A1 | 5/2003 | Srinivasan et al. | |
| 2004/0098454 | A1 | 5/2004 | Trapp et al. | |
| 2005/0147246 | A1 | 7/2005 | Agrawal et al. | |
| 2006/0095378 | A1 | 5/2006 | Aggarwal et al. | |

FOREIGN PATENT DOCUMENTS

| WO | WO-03102775 A2 | 12/2003 |
|---|---|---|
| WO | WO-2005045670 A1 | 5/2005 |

OTHER PUBLICATIONS

"Poster Presentations by Students and Postdocs", *PORTIA Project Site Visit*, Stanford CA,(May 12-13, 2005),1-25.

Agat, J. , et al., "On Confidentiality and Algorithms", *Proceedings of the 2001 IEEE Symposium on Security and Privacy or Programming Under the Constraints of Noninterference*, (2001), 1-14.

Benenson, Z , et al., "Secure multi-party computation with security modules", Z. Benenson, F. C. Gartner, and D. Kesdogan. *Secure Multi-Technical Report Oct. 2004, RWTH Aachen University of Technology*, (2004),12 pgs.

Bhiri, S , et al., "Ensuring required failure atomicity of composite Web services", *Proceedings of the 14th International Conference on World Wide Web*, 138-147.

Dreiling, A. , et al., "Model-Driven Process Configuration of Enterprise Systems", *Proceedings of the 7th Conference on Wirtschaftsinformatik*, (2005),1-20.

Malkhi, D. , et al., "Fairplay—A Secure Two-Party Computation System", *Proc. Usenix Security Symposium 2004*, 1-20.

(Continued)

*Primary Examiner* — John Chavis
(74) *Attorney, Agent, or Firm* — Schwegman, Lundberg & Woessner, P.A.

(57) ABSTRACT

A system includes a communication unit to receive a request to change a configuration of an application program, and a storage unit to access a configuration state that represents the configuration. The system further includes a processing unit to identify a further configuration state that is consistent with a system of rules. The further configuration state represents a further configuration that complies with the request. The processing unit uses an integrity preserving transition to change the configuration to the further configuration. The integrity preserving transition terminates with the further configuration when the integrity preserving transition changes the configuration.

20 Claims, 13 Drawing Sheets

OTHER PUBLICATIONS

Recker, J., et al., "On the Syntax of Model Configuration—Transforming the C-EPC into Lawful EPC Models", *BPRM 2005, Workshop on Business Process Reference Models*, (2005),1-16.

Sabelfeld, A., et al., "Language-Based Information-Flow Security", *IEEE Journal on Selected Areas in Communications*, 21(1), (Jan. 2003).

Van Der Aalst, W.M.P., et al., "Workflow Patterns", *Distrib. Parallel Databases* 14(1), (2003),5-51.

Van Der Aalst, W., et al., "YAWL: Yet Another Workflow Language", *QUT Technical report, FIT-TR-2003-04, Queensland University of Technology*, Brisbane, (2003), 1-44.

"Extended European Search Report, Application No. 07 004 680.0-1243", (May 25, 2007).

* cited by examiner

SYSTEM AND METHOD FOR CONFIGURING APPLICATION PROGRAMS

TECHNICAL FIELD

Embodiments relate generally to the field of electronic data processing and more particularly to architecture of application programs.

BACKGROUND AND PRIOR ART

The field of electronic data processing has become more and more important. There have been significant gains in the performance of hardware such as computer systems, and this has enabled the development of application programs that may be able to perform complex tasks. Today, application programs are developed to run on computer systems in many different areas and possibly providing different functions.

An application program may be configurable, that is, one or more parameters may be set so that the application program functions in a desired way. For example, a parameter may be used to switch on and off a specific function of the application program. In a different example, changing a parameter may modify a function of the application program. A configurable application program may provide many different functions. Such an application program may have many different parameters that are configurable to determine how the application program works.

An example for configurable application programs may be enterprise-level applications (e.g., enterprise resource planning (ERP) programs). Such software applications may be used to support processes of an enterprise, for example a company. Many applications may be totally or partially generic so that they may be used for companies with different processes and of different sizes. It will be appreciated that a certain degree of customisation may be necessary with respect to such applications to adapt the applications to the processes of an individual company. Furthermore, configuring an application may involve changing numerous parameters two or more of which may be related to each.

BRIEF DESCRIPTION OF DRAWINGS

Some embodiments are illustrated by way of example and not limitation in the figures of the accompanying drawings in which.

DETAILED DESCRIPTION

Figure 1:
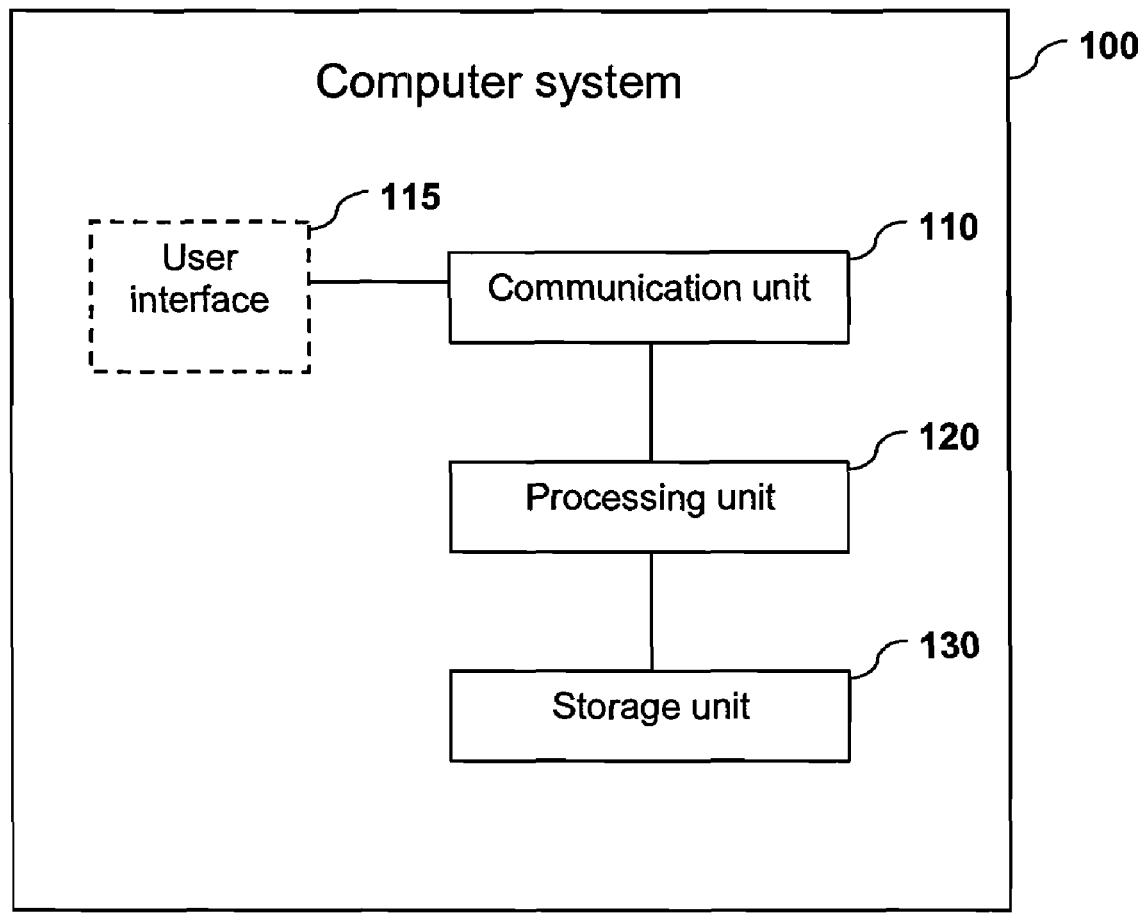
FIG. 1 is a simplified block diagram of an example embodiment.

The following description of examples includes details for illustrating embodiments and is not intended to limit the scope of the embodiments or to be exhaustive. In the following description, for purposes of explanation, numerous specific details are set forth in order to provide a thorough understanding of some example embodiments. It will be evident, however, to one skilled in the art that the present invention may be practiced without these specific details.

Changing a configuration of an application program to obtain a consistent configuration may be related to different aspects. Changing the configuration may involve setting one or more parameters in such a way that the application program functions in a desired way. Furthermore, there may be rules that may be related to a configuration so that a consistency of the configuration may be checked according to one or more criteria. The different aspects relate to how to obtain a configuration that has a consistency.

One example aspect may include a system for changing the configuration. The system may include a communication unit, a storage unit, and a processing unit. The processing unit may use a set of configuration states that represent configurations of the application program and that are consistent with a system of rules. The processing unit may identify a further configuration state and use an integrity preserving transformation to ensure that the further configuration is obtained that has the consistency or that the configuration remains unchanged.

The system may be used to change numerous parameters of a configuration in one step. This may be faster than changing individual parameters of a configuration. Changing individual parameters of a configuration may involve data processing for identifying each individual parameter and each value to which the parameter is changed. When changing individual parameters a consistency of the configuration may be checked following for example a final change of the individual parameters. Therefore, a found inconsistency may be more difficult to correct because prior changes of the individual parameters may be required to be taken back. The system may change a dependent parameter automatically because dependencies between the dependent parameter and further parameters may be used to specify a value of the dependent parameter. The system may be used to make multiple changes of the configuration simultaneously which may be faster than making multiple changes sequentially. Therefore, the system may be used so that for example a plurality of parties may be able to make changes of the configuration simultaneously. The system may change the configuration in one transaction so that consistency may be provided for example on the level of data base tables. This may be faster than using multiple transactions for example for changing contents of one or more data base tables. The system may be able to access a storage unit having the configuration once for changing the configuration which is faster than accessing the storage unit multiple times for changing each parameter individually. Furthermore, the system provides more security than changing individual parameters of a configuration because consistency of the configuration is preserved during the change process. The system is disclosed and variations of the systems are disclosed with further optional features.

A further example aspect is a computer-implemented method for changing the configuration. The method includes with other operations identifying the further configuration state to ensure that the further configuration has the consistency. The method includes using the integrity preserving transformation to ensure that the further configuration is obtained or that the configuration remains unchanged.

The method may be used to change numerous parameters of a configuration in one step. Using one step for changing the configuration gives the method desired features that are identical to desired features of the system. The method is disclosed and variations of the method are disclosed with further optional features.

A further example aspect is a computer program product that may have features that correspond to features of the method. Accordingly, the computer program product has desired features of the method. The computer program product is disclosed and variations of the computer program product are disclosed with optional features.

FIG. 1 is a simplified block diagram of a system, according to an example embodiment. The example embodiment includes a computer system 100 for changing a configuration of an application program. The computer system 100 includes a communication unit 110, a user interface 115, a processing unit 120, and a storage unit 130. The user interface 115 is an optional component as is indicated by a broken line in the figure. In a further example, the user interface 115 may be a part of a further computer system. Lines between components of the computer system represent communicative couplings (or interfaces) between the components so that data may be exchanged in either direction.

The computer system 100 may be a personal computer (PC), a server, or a plurality of servers configured to execute software programs. The computer system 100 may include a client and a server related according to client server architecture, or may include one or more peer computers arranged in a peer-to-peer (or distributed) architecture. In a further example, the computer system may include a plurality of individual computer systems that are connected by the Internet or by an intranet of for example a company.

The computer system 100 may run (for example host and execute) the application program and a program which allows for changing the configuration of the application program. The program which allows for changing the configuration may be a part of the application program. In a further example, the computer system 100 may allow for changing the application program which runs on a further computer system.

The communication unit 110 is configured to receive a request for changing the configuration. The request may be created by a user that desires to configure the application program, that is, to adjust the application program to work in a specific way. The user may be also a user of the application program or the user may be an information technology (IT) specialist or consultant that configures the application program for further users.

In the example, the communication unit 110 is communicatively coupled to the user interface 115. The user interface 115 may include (or at the very least provide data to and receive data from): a monitor, for displaying graphical user interfaces to the user, a keyboard and a pointing device (e.g., a mouse) for entering input, together with further interfaces such as voice controlled interfaces. With the user interface 115, the user may create the request and the request may be processed and sent to the communication unit 110. The communication unit 110 may include a specialized processing unit (not shown) for receiving data from the user interface 115. In a further example, the communication unit 110 may include a connection (not shown) to the Internet so that requests from the Internet may be received. Instead of the Internet, an intranet of an entity such as a company may be used. In a further example, the communication unit 110 may be a terminal that is a part of the computer system but may be located in a room different from a room with further units of the computer system 100. The communication unit 110 may send data representing the request to the processing unit 120 and the processing unit may send a further request for retrieving data from the storage unit 130.

The storage unit 130 is configured to access a configuration state that represents a configuration relating to the application program, as will be described more fully below. The storage unit 130 may include a random access memory (RAM), a data base, or a file stored on a hard disc drive. The storage unit 130 may include a further computer system that is used for storing data such as a data base server.

The configuration may include parameters that may be configured to modify a processing of data of the application program in a predetermined way. Setting the parameters may also be part of a customization of the application program. The parameters may be contents of fields stored in one or more data base tables or values stored in a file or object. The configuration may include numerous (e.g., thousands of) parameters, as for example may be the case for enterprise-level programs, or enterprise applications such as for example enterprise resource planning (ERP) programs. The configuration state may be an object of a model. The model may be used to represent configurations of the application program in order to simplify configuring the application program. In a further example, the configuration state may include each parameter of the configuration. The configuration states may include elements. An element of a configuration state may be defined according to the model and may represent one or more parameters or parameter values of a configuration. In a further example, the element may be identical to a parameter of the configuration.

The processing unit 120 is configured to identify a further configuration state that is consistent with a system of rules. The storage unit 130 may be a central processing unit (CPU) of a computer system. The system of rules may for example include rules that describe meaningful relations between elements of configuration states. The rules may generally apply to configuration states and may be used to check one or more criteria that configuration states may be required to fulfill. The criteria may be applied to configuration states and therefore be used to define a consistency of a configuration. A configuration state fulfilling the criteria may represent a configuration that is correct from a formal point of view. In an example, a further configuration state may be also an object of the model and therefore may be consistent according to the system of rules. The number of rules that the system of rules include may vary and in a further example, the system of rules may include one rule. Furthermore, the further configuration state may represent a further configuration that complies with the request. The processing unit 120 may be further configured to use an integrity preserving transition to change the configuration to the further configuration. The integrity preserving transition may terminate with the further configuration, when the integrity preserving transition changes the configuration. In the example, the integrity preserving transition may either completely change the configuration to the further configuration or may leave the configuration in its original state.

Figure 2:
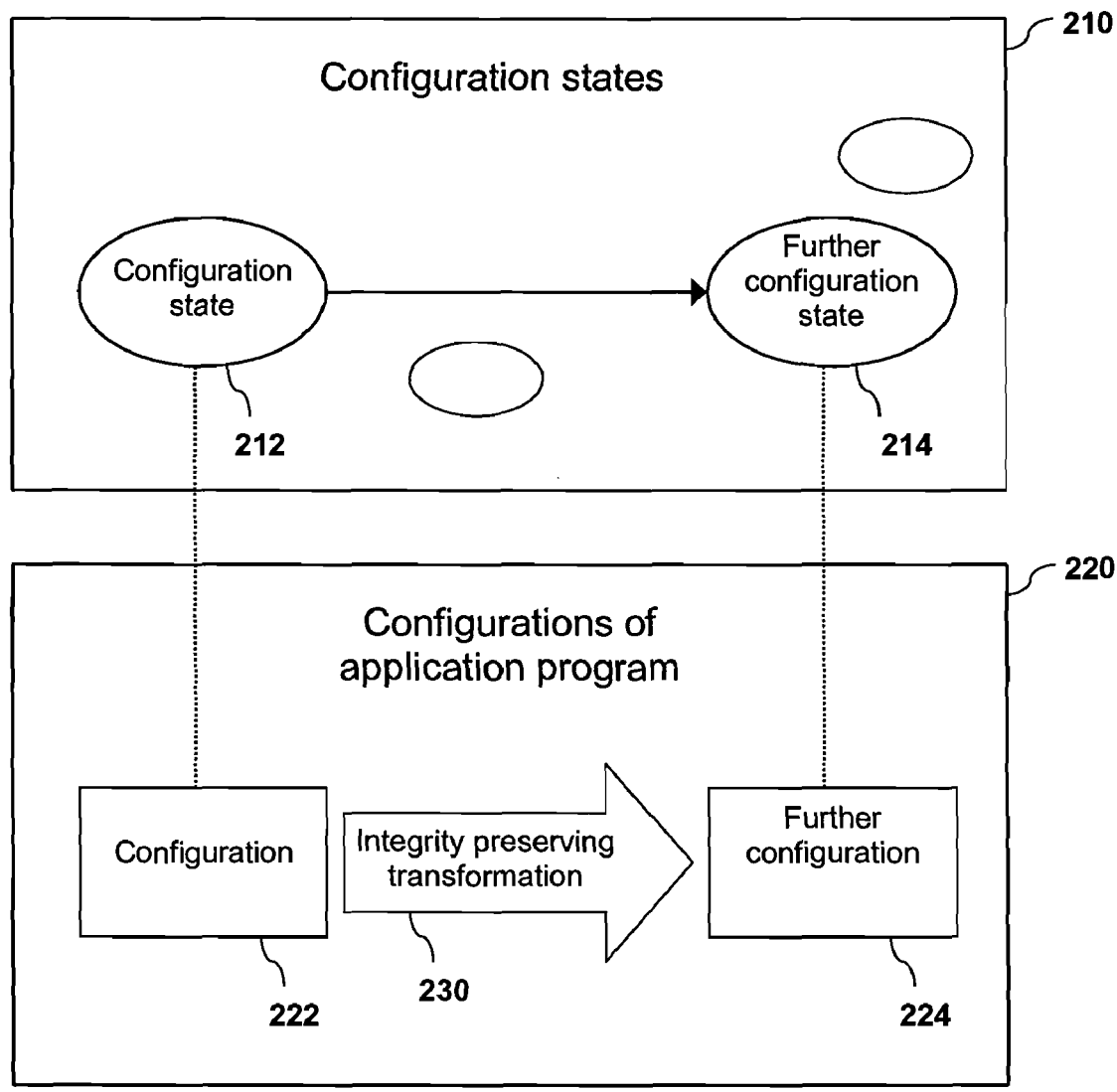
FIG. 2 is a state diagram illustrating example relationships between configuration states and configurations.

FIG. 2 is a state diagram illustrating relations between configuration states and configurations, according to an example embodiment. In the example, the user may be provided by the user interface 115 with a graphical object that represents a configuration state 212. The graphical object may for example be a diagram or a list of parameters. The configuration state 212 is a one state of a set 210 of configuration states that are consistent according to a model. The configuration state 212 represents a configuration 222 (e.g., an actual current configuration of the relevant application program). The configuration 222 may be one configuration of a set 220 of possible configurations of the application program. In a further example, the configuration state 212 may be inconsistent according to a model. A reason may be, for example, that the application program may be sent to a customer with a default configuration that is not supposed to have a consistency. In the further example, the default configuration may be required to be changed by the customer prior to the application program may start to work properly.

The user may desire to change the configuration 222 based on the configuration state 212. Accordingly, the user may use the user interface 115 to create the request to change a value of a specific element of the configuration state 212 to a new value. The system 100 may identify the further configuration state 214 and determine whether a desired further configuration 224 represented by the configuration state 214 fulfills a number of criteria or requirements. In the example, the further configuration state 214 may include the new value of the element but may also include new values of further elements that are required to ensure consistency of the further configuration 224. By identifying the further configuration state 214, the system 100 seeks to ensure that the further configuration 224 may be consistent with predetermined criteria or requirements. By using the integrity preserving transformation 230, the system 100 ensures that the further configuration 224 is reached, that is, when the configuration is changed at all.

As an example, the configuration states 210 may represent processes of the application program and the elements may represent process steps or operations of the processes. According to a model, the processes and process steps may be related to the configuration of the application program. Furthermore, the system of rules may include semantic rules for relating elements of the configuration states. Semantic rules may be rules that are set up to apply to contents of the configuration. Accordingly, semantic rules may for example be related to specific values of elements and describe dependencies to specific values of further parameters. In an example, semantic rules may be represented using semantic patterns that may be created according to pattern rules.

The system of rules may also include syntactic rules for relating elements of the configuration states. Syntactic rules may for example represent formal rules that apply to each element of a configuration state or a group of elements of a configuration state. Syntactic rules may for example include using syntactic patterns that are defined according to pattern rules. In a further example, it may also be that the system of rules includes syntactic rules without including semantic rules.

In an example, the processes may be workflows and the system of rules may include a formal language for describing workflows. Examples for such workflow languages include: Event-driven Process Chains (EPC), Petri nets, and Yet Another Workflow Language (YAWL).

In the example, the integrity preserving transition may roll back one or more partial changes of the configuration when a further partial change of the configuration fails. Changing the configuration may include changing many parameter values that may for example be stored in different data base tables. A partial change of the configuration may include changing a single parameter value or may include changing several parameter values that are stored in one data base table. When a change to a parameter value has been completed, and a following change of a further parameter value in a further data base table fails previous changes may be rolled back. Such roll backs may be independent from a commit structure that may be provided by a data base system. Rolling back a change of a parameter value may include explicitly changing again the new value back to the original value. The original value may have been stored by the example system for enabling a roll back.

The integrity preserving transition may change the configuration in atomic units that include one or more partial changes. Each partial change of an atomic unit may be related by the system of rules to a further partial change of the atomic unit when the atomic unit comprises more than one partial change. In an example, the atomic unit may be a cluster of partial changes that depend directly or indirectly on one partial change of the cluster, that is, the one partial change has, as a consequence, one or more further partial changes to the cluster. Partial changes that may not depend on a partial change of the atomic unit may be excluded from the atomic unit. In a further example, changing the configuration may include one partial change only.

The integrity preserving transition may include partial changes that are independent of further partial changes of a further integrity preserving transformation for changing the configuration. In an example, this may mean that parallel changes of the configuration may be possible as long as they affect different partial changes (e.g., as long as they are isolated).

Furthermore, a following integrity preserving transition may change the further configuration that is a result of a previous change to a further following configuration. The following integrity preserving transition may directly follow a termination of the previous integrity preserving transition. Accordingly, a result of the integrity preserving transition may be transparent and durable and therefore accessible to following integrity preserving transitions. In a further example, the configuration state 212 may be identifiable with the configuration 222 and the further configuration state 214 may be identifiable with the further configuration 224. Therefore, in the further example the integrity preserving transformation may be identifiable with a transformation from the configuration state 212 to the further configuration state 214. Furthermore, in the further example features of the integrity preserving transformation may be used to identify the further configuration state 214. In the further example, the system of rules may be used to determine the partial changes of the integrity preserving transformation or the atomic units of the integrity preserving transformation. Furthermore, in the further example the system of rules may be used to determine partial changes that are independent of further partial changes.

Figure 3A:
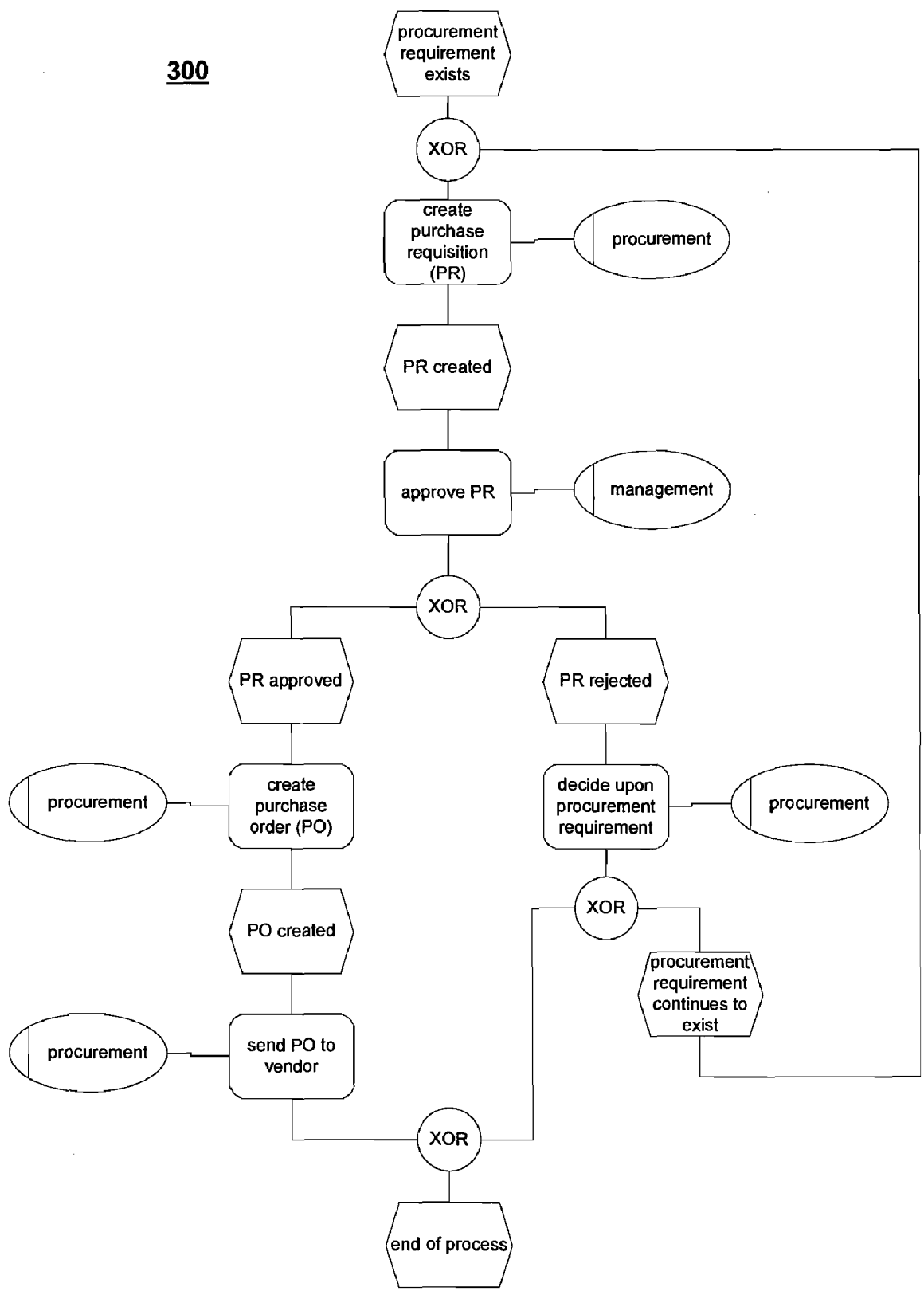
FIG. 3A is a flowchart illustrating an example workflow described by event-driven process chains.

FIG. 3A is a flowchart illustrating an example workflow 300 described by event-driven process chains, according to an example embodiment. The Event-driven Process Chain (EPC) notation is an example of a language for describing workflows. EPC diagrams are examples of syntactic patterns, wherein the syntax may include rules of the language. EPC diagrams may be part of an ERP program to support a customer in implementation of an ERP program, in a desired way. EPC diagrams may be part of an interactive program for displaying the EPC diagrams to a user and for changing the EPC diagrams. The interactive program may enable dragging and dropping elements of an EPC diagram in order to build an EPC diagram or to modify an EPC diagram. Furthermore, the EPC diagram may be coupled to the configuration of the application program, so that a change of the EPC diagram result in a changing of parameters of the configuration to comply with the changed EPC diagram. According to an example, changing an EPC diagram may lead to changes to entries in one or more data base tables and further to the generation of coding to model a process represented by the EPC diagram. In a further example, diagrams representing a workflow may be created according to rules of, and using the notations of, Petri nets or YAWL.

EPC may include functions of a workflow that are represented by boxes with rounded corners and events of a workflow that are represented by hexagons. Functions and events may be called basic elements of an EPC. Ovals may be elements of the EPC that represent organizational units.

Lines between elements represent a control flow of the workflow between the elements. The workflow may start at the top of an EPC diagram and flow along the lines. Circles in an EPC diagram may represent connectors. A connector may be a split with one incoming control flow and two or more outgoing control flows or a join with two or more incoming control flows and one outgoing control flow. A circle may further specify a function that may influence the control flow. As an example, a circle with an "XOR" label may represent an exclusive-or operation, valid for the incoming or outgoing control flows of the connector.

An example of a syntactic rule for basic elements of an EPC is that, between two sequential functions along a control flow, an event may be required to be used. Similarly, between two following events along a control flow, a function may be required to be used.

The example workflow 300 describes a process for ordering for example materials in a company. The process may be also used for ordering services. The process may start with the event that a procurement requirement exists. It may be that products used in a factory as components of a further product are out of stock. In a further example, it may also be that the office supply is out of pencils. The event is followed by a connector and by a function that includes creating a purchase requisition (PR). The responsible organizational unit of the function is the procurement department. The function may also follow a further event as is indicated by the XOR-connector. The function is followed by an event in which the PR is created and the function in which the PR is approved by management. According to the figure, the PR may be either approved or rejected. If the PR is approved, the procurement department creates a purchase order (PO), which is followed by an event in which the PO is created and a function in which the PO is finally sent to a vendor. If the PR is rejected, the process proceeds to a function in which the procurement department decides upon the procurement requirement. Accordingly, it may either follow that the procurement requirement continues to exist, in which case the function to create a PR may follow or it may follow that the process ends, that is, the procurement requirement remains unfulfilled.

The workflow of the fulfilling the procurement requirement according to FIG. 3A may be a standard process that is modelled by an ERP program. It may be that the ERP program is delivered with such a process as a default process that most customers may desire. It may also be that the workflow is a result of a customization, that is, has been configured to be suitable to the needs of a customer.

Figure 3B:
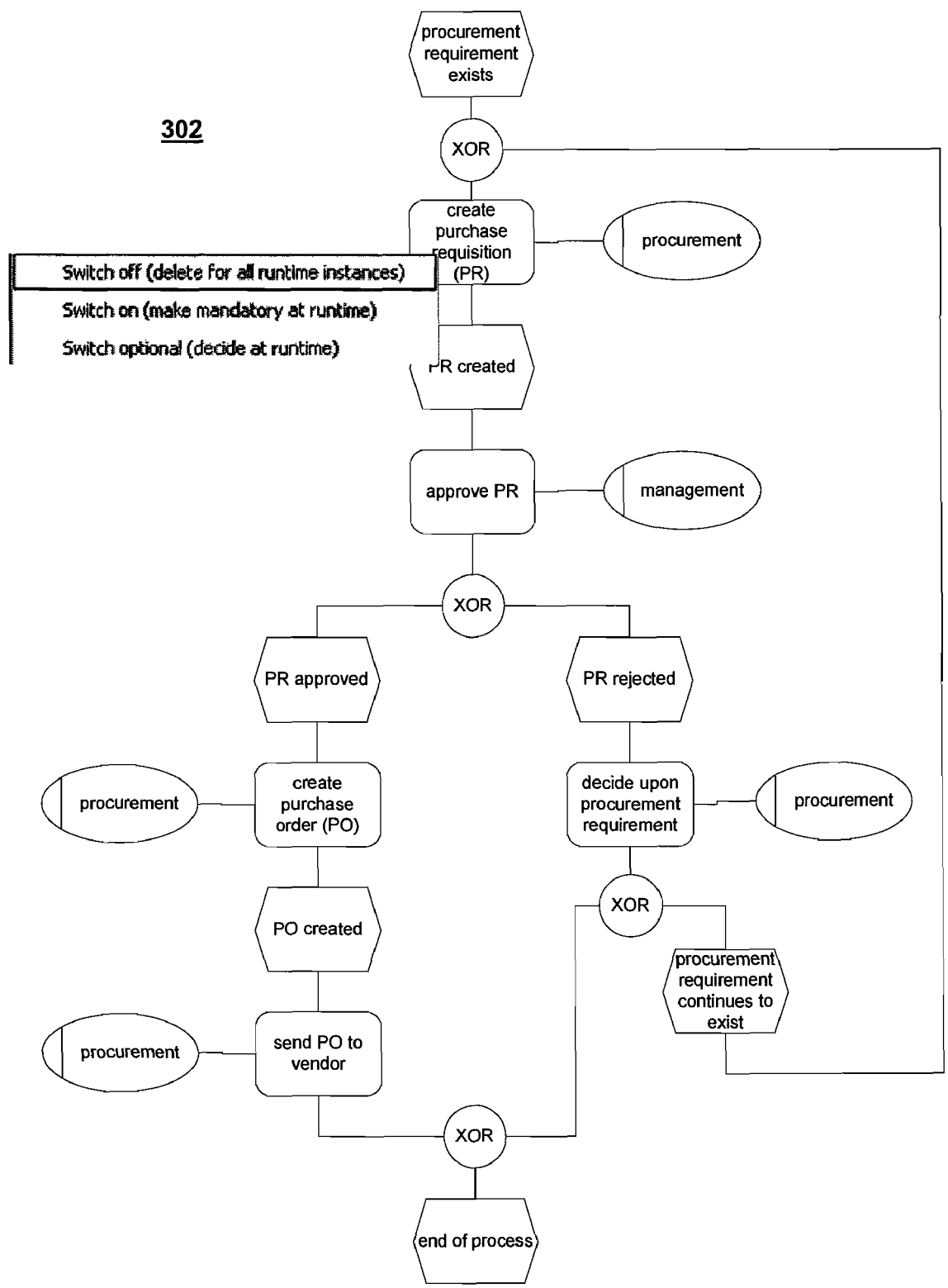
FIG. 3B is a flowchart illustrating an example of the workflow with a user interface for requesting a change of a configuration.

FIG. 3B is a flowchart illustrating an example of a workflow 302 with a user interface for requesting a change of a configuration, according to an example embodiment. The user, for example a consultant, implementing the ERP program may be instructed to configure or to reconfigure the process of fulfilling a procurement requirement. According to the instruction, the user may use the interactive program to mark a configurable element of the EPC diagram and use a right mouse button to open a context menu. In FIG. 3B, the example configurable element is the function to create a PR. It may be that configurable elements, that is, elements that may be related to a change of a configuration, are displayed in a different color. In this way, the user can easily identify elements that may be configured in different ways. It may also be that lines of boxes representing a configurable element may be thicker than non-configurable elements. In a further example, the user may use a menu to select elements and change configurable elements.

In FIG. 3B, the example context menu offers three operations executable on the configurable element. A first option is to switch off the function to create a PR (e.g., to delete the function for all runtime instances). A second option is to switch on the function (e.g., to make the function mandatory at runtime). The second option may for example already be represented by the EPC diagram. In a further example, the displayed EPC diagram may represent a configuration state that is inconsistent because the decision regarding how to configure the configurable function may not yet had been made. Accordingly, in the further example, the EPC diagram may represent a configuration that may not be used to start the application program. A third option of the context menu is to designate the function as optional (e.g., at runtime it, is decided whether the PR is created or not). Such a decision may for example depend on the value of the procurement requirement or on the person starting the procurement process.

As shown in FIG. 3B, the user may select the first option from the context menu leading to a following diagram that may be considered an intermediate diagram.

Figure 3C:
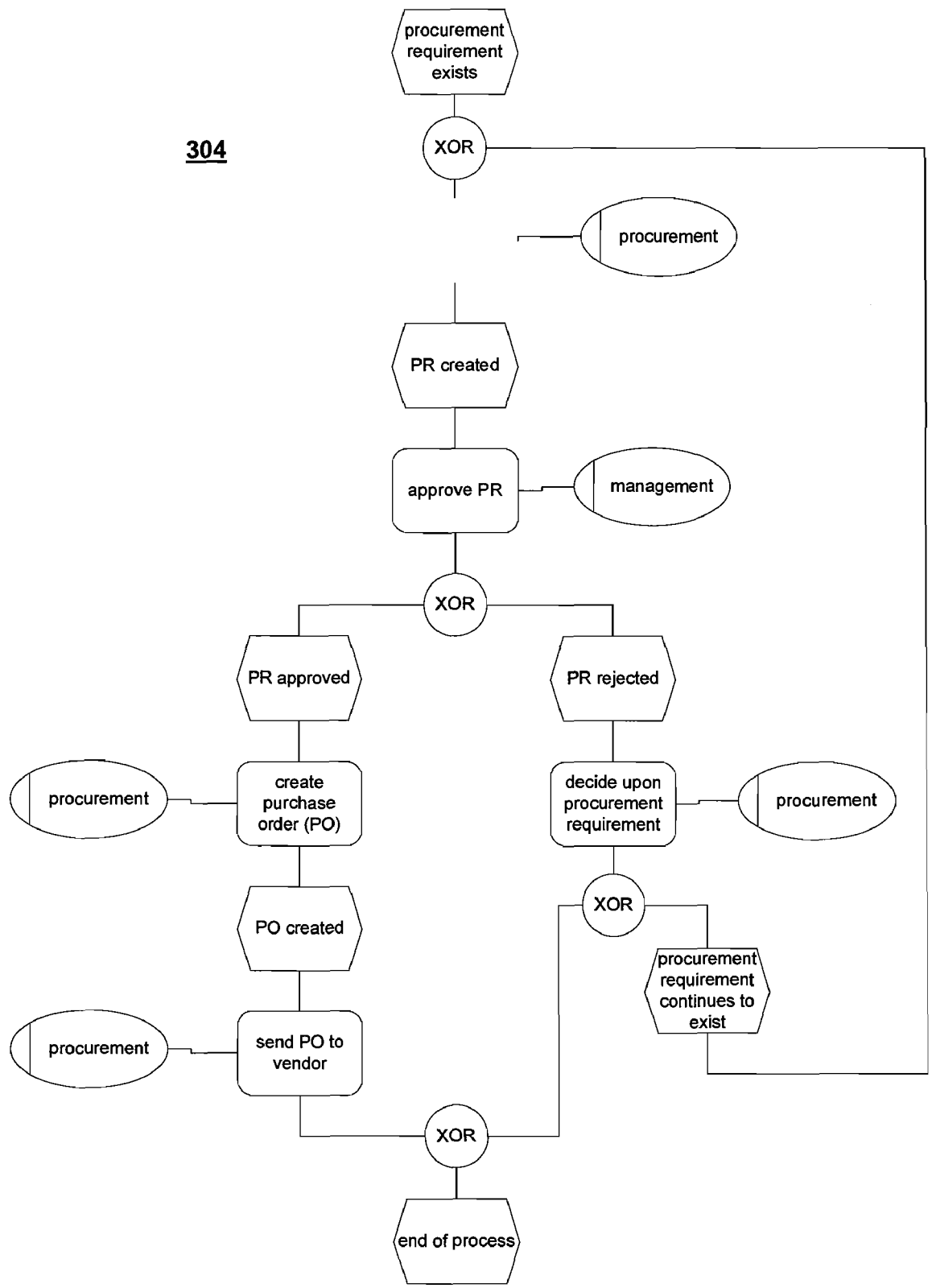
FIG. 3C is a flowchart illustrating a first intermediate workflow, according to an example embodiment, complying with the requested change.

FIG. 3C is a flowchart illustrating an example of a first intermediate workflow 304 complying with the requested change, according to an example embodiment. The first intermediate workflow 304 may directly follow a selection of the first option of the context menu. According to the selection of the context menu of switching off the function to create the PR, the function is deleted from the EPC. The resulting intermediate workflow may be considered as an inconsistent workflow and is represented by an intermediate EPC diagram that is inconsistent according to EPC rules. In a further example, the first intermediate workflow may not be displayed to the user.

Figure 3D:
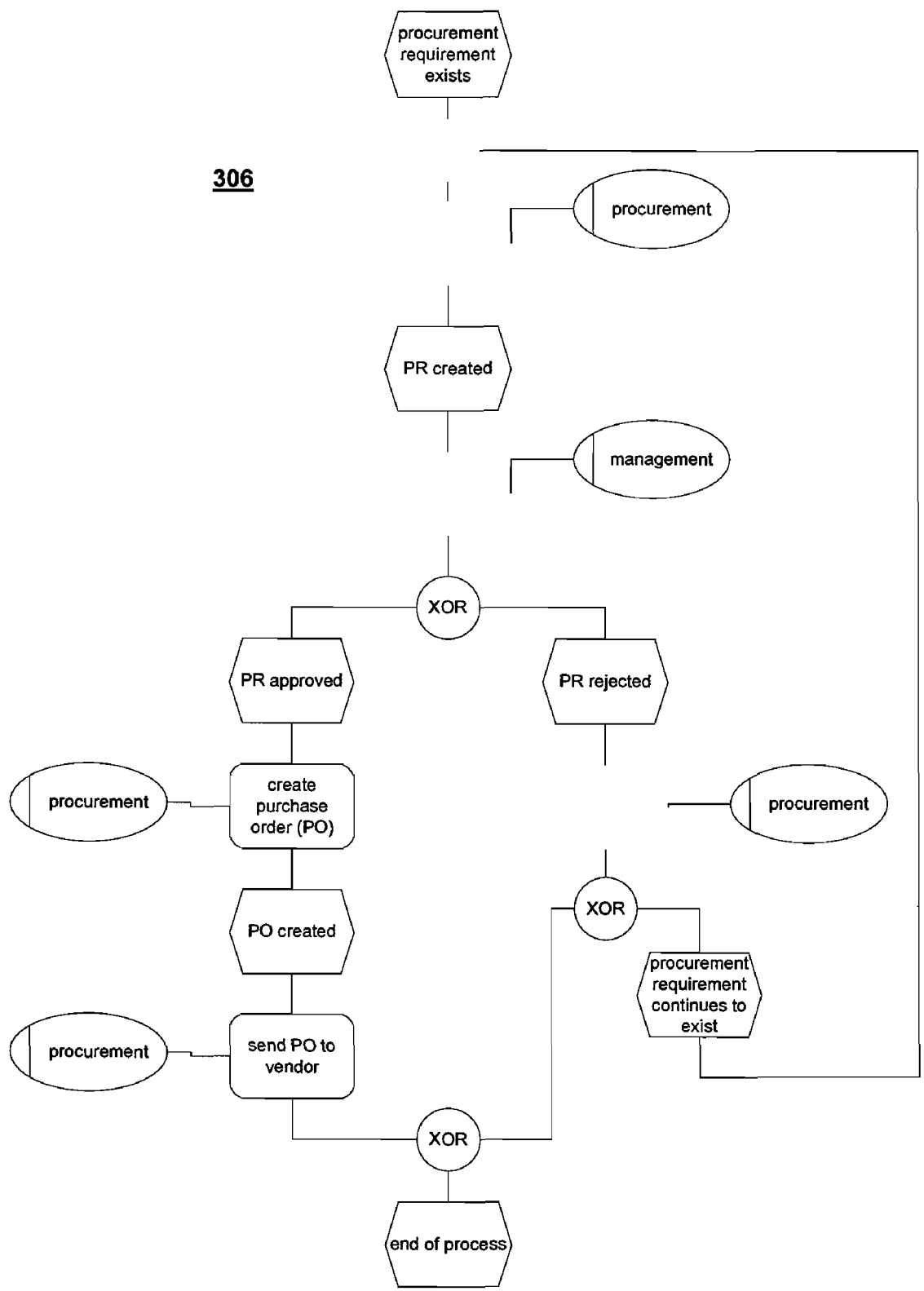
FIG. 3D is a flowchart illustrating a second intermediate workflow, according to an example embodiment, that includes semantic consequences of the requested change.

FIG. 3D is a flowchart illustrating an example of a second intermediate workflow 306, according to an example embodiment, that includes semantic consequences of a requested change. An intermediate EPC diagram representing the second intermediate workflow 306 may directly follow the EPC diagram representing the first intermediate workflow. In FIG. 3D, the EPC diagram with the second intermediate workflow is also inconsistent with respect to rules of EPC.

Semantic rules for the process of fulfilling a procurement requirement may for example specify that the function to create the PR may have dependent functions that follow in the workflow. Furthermore, according to the example semantic rules, the dependent functions may not be in an EPC diagram without the function on which the dependent functions depend. The dependent functions may be to approve the PR and to decide upon the procurement requirement. The EPC diagram representing the second intermediate workflow is consistent with the example semantic rules because, in FIG. 3D, the dependent functions are deleted. In a further example, the second intermediate workflow may not be displayed to the user.

Figure 3E:
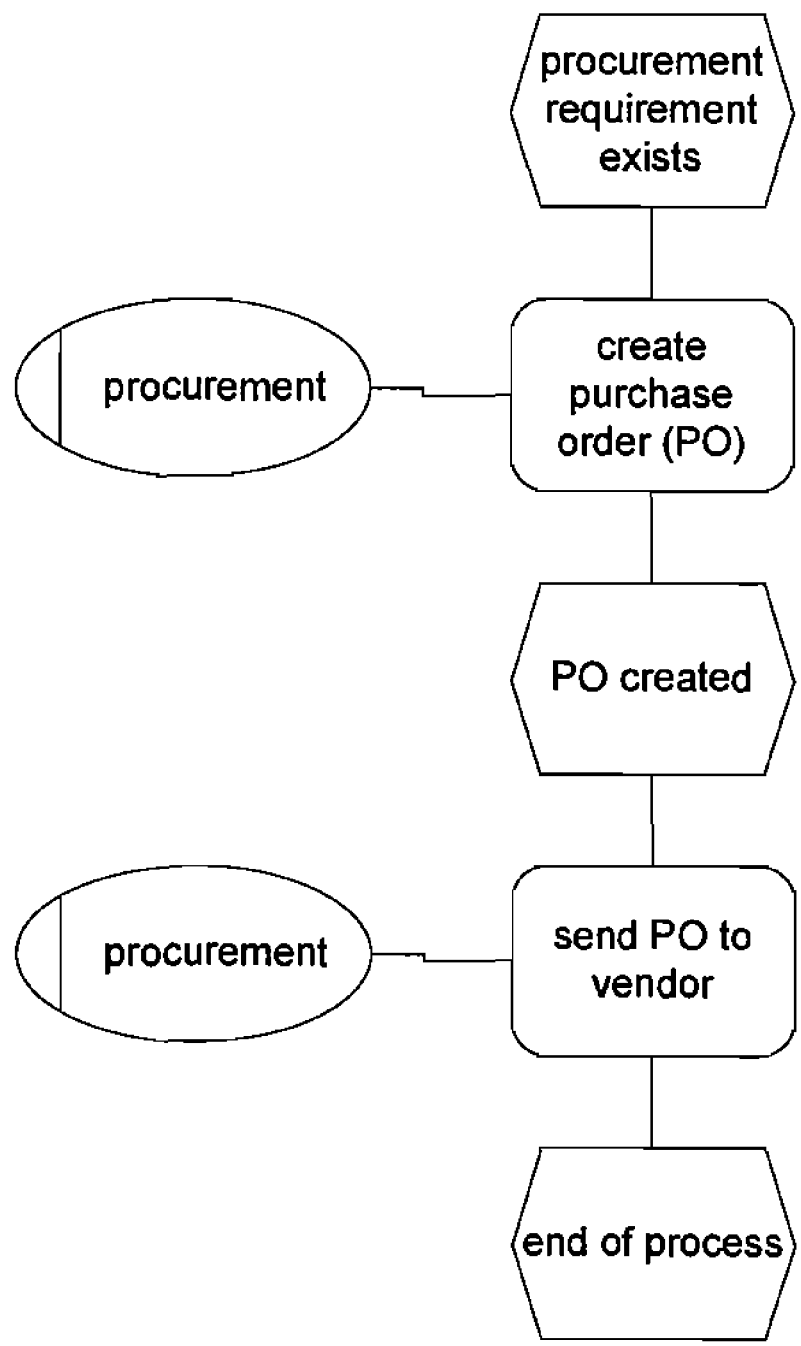
FIG. 3E is a flowchart illustrating a further workflow, according to an example embodiment, that complies with the requested change and is consistent.

FIG. 3E is a flowchart illustrating an example of a further workflow 308, according to an example embodiment, that complies with the requested change and is consistent. The EPC diagram representing the further workflow 308 is an example of the further configuration state that represents the further configuration. In a further example, the workflow 308 may also be used to represent the further configuration state. The further configuration state is consistent according to semantic rules and according to syntactic rules that may include EPC language rules. Therefore, the further workflow 308 may represent a meaningful workflow with respect to contents oriented aspects and formal aspects.

The syntactic rules that may be used to derive the further workflow 308 may specify that a control flow may be required to be without interruption. Furthermore, interrupted control flows may be required to be deleted completely. The syntactic rules may specify that an event that follows a prior event, without a function in between, may be required to be deleted. According to this rule, one or more events may be required to be deleted until a consistent EPC diagram emerges. In the example, according to the rule a complete sequence of events including the event that the procurement requirement continues to exist is deleted. In a further example, the syntactic rules may specify that an event that follows a deleted function may be required to be deleted. In the example, the organizational units that are related to a deleted function are deleted according to a further syntactic rule. According to a further rule, connectors that have one incoming control flow and one outgoing control flow may be deleted, too. In FIG. 3E, the resulting EPC diagram is simple compared to the EPC diagram representing the original workflow. The example system has derived the further workflow and the further configuration modelled by the further workflow using a system of semantic and syntactic rules. The example system has analyzed dependencies between elements of workflows, including intermediate workflows, to find out the semantic and syntactic consequences of the requested change. The system has identified a consistent EPC diagram and complies with the requested change, that is, has no function to create a PR.

Figure 3F:
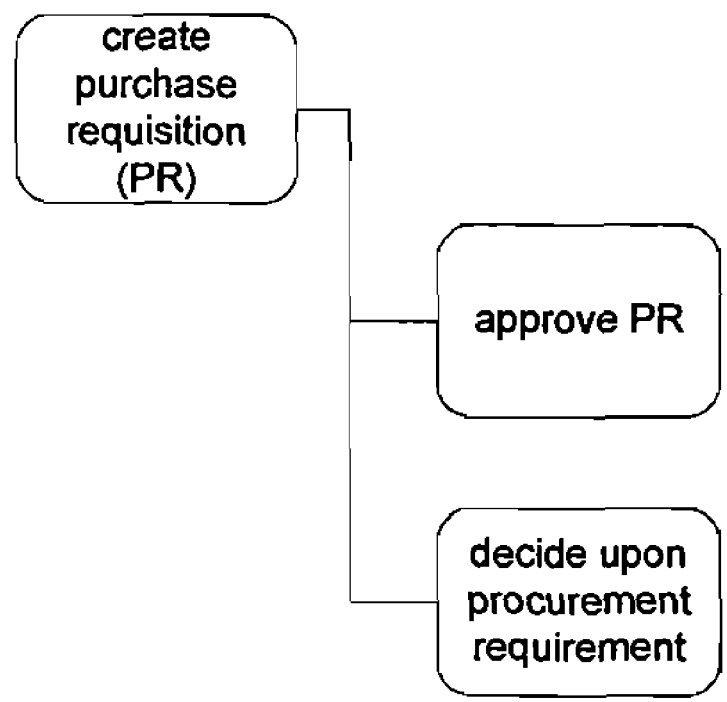
FIG. 3F is a relationship diagram illustrating an example semantic relation, according to an example embodiment.

FIG. 3F is a block diagram illustrating an example semantic relation 309. The example semantic relation may be used to derive the semantic consequence following from deleting the function to create a PR. In other words, the example semantic relation may be used to derive the second intermediate workflow. The diagram of the example semantic relation may be an example of a semantic pattern created according to semantic pattern rules.

The example semantic relation represents the dependency between the configurable function to create the PR and the dependent functions to approve the PR and to decide upon the procurement requirement. It may further include that dependent functions may be required to be deleted when the configurable function is deleted.

The diagram may be displayed to a user that changes the configuration. The diagram may also be displayed in an interactive program to a designer of workflows modelled by the ERP program. The designer may use the interactive program to create or to change dependencies between functions, that is, to define semantic rules valid for a workflow.

Figure 4:
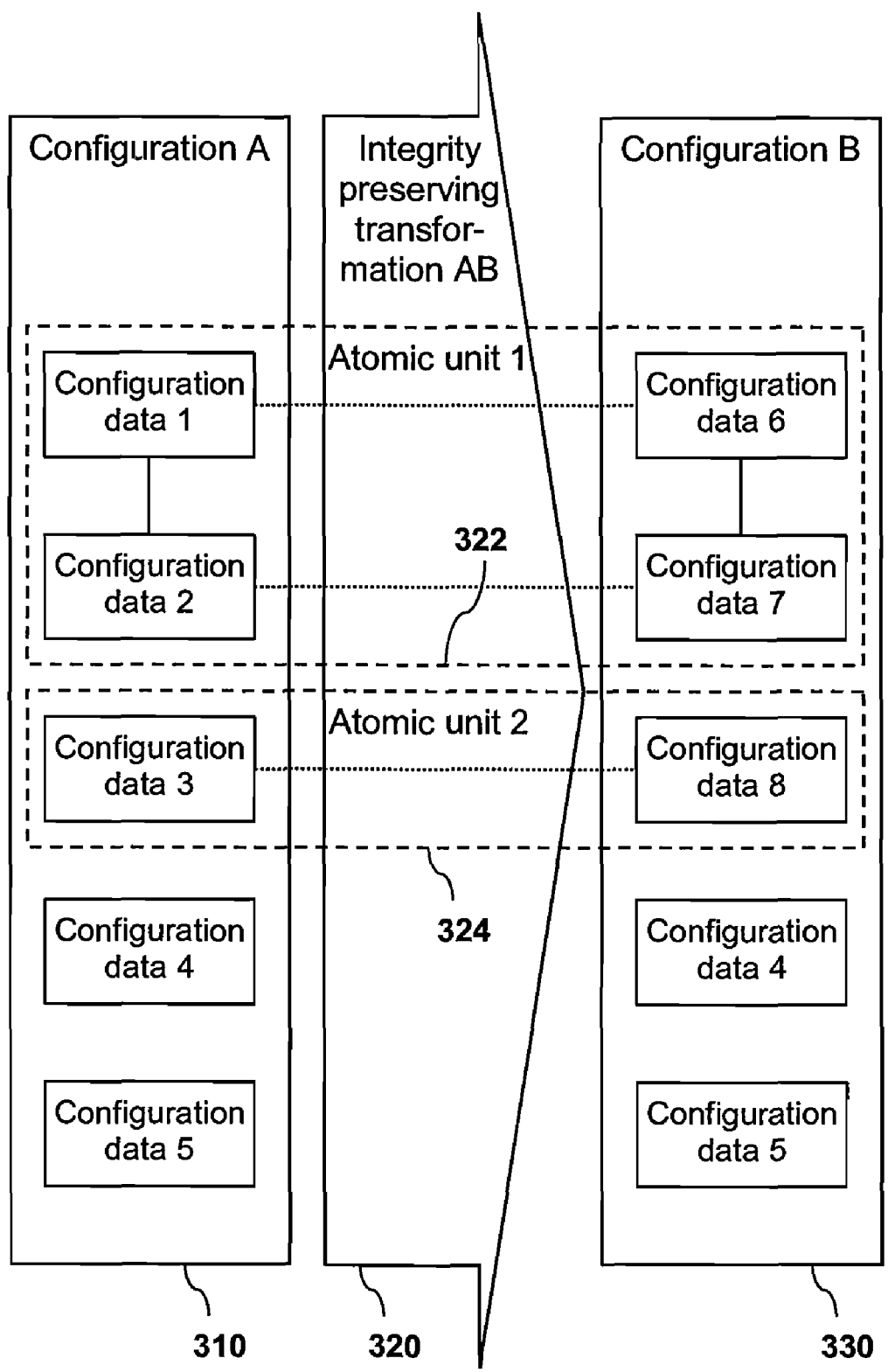
FIG. 4 is a diagram of an example change of configurations using an integrity providing transformation.

FIG. 4 is a diagram of an example change of configurations using an integrity providing transformation. Configuration A 310 is an example of a configuration that the user may request to change based on a configuration state that represents the configuration A. The system 100 may have received the requested change, identified the further configuration state that represents configuration B 330. The system 100 may use the integrity providing transformation AB 320 to change the configuration A to configuration B.

Configuration A includes five different configuration data, that is, configuration data 1, configuration data 2, configuration data 3, configuration data 4, and configuration data 5. A configuration data may for example be an entry of a data base table or a block of entries in a data base table. A configuration data may also include entries in different data base tables that are related to each other. A configuration data may also be a global parameter of the application program that is stored in a file on a hard disc drive of the computer system 100. A configuration data may represent a set of data that is changed by a partial change of an integrity preserving transformation.

According to the requested change configuration data 1, configuration data 2, and configuration data 3 may be changed. It may be that a change of the configuration data 1 and configuration data 3 is directly due to the requested change. It may be that a change of the configuration data 2 may be due to a dependency following from the system of rules so that the configuration B is represented by a consistent configuration state. The dependency between the configuration data 1 and the configuration data 2 is represented by a line between the boxes representing the configuration data.

The integrity preserving transformation may change the configuration A using an atomic unit 1 322 that includes partial changes of the configuration data 1 and configuration data 2. The partial changes of the atomic unit 1 may be related by the system of rules, that is, changing configuration data 1 may lead to a change of configuration data 2. The integrity preserving transformation 320 may further change the configuration A using an atomic unit 2 324 including a partial change of configuration data 3. In an example, the partial changes of the atomic unit 1 may be independent of the partial change of the atomic unit 2. Therefore, in the example it may be possible to execute partial changes of atomic unit 1 only and reach a configuration that is represented by a consistent configuration state. Furthermore, in the example it may be that, by changing configuration data 1 without changing configuration data 2, it may not be possible to reach a configuration that is represented by a consistent configuration state.

Determining the atomic units may be based on such criteria. For example an atomic unit may include configuration data items that are dependent on each other according to the system of rules and exclude configuration data items that are independent of each other according to the system of rules.

In a further example, the system 100 may not be able to execute the partial change of the configuration data 3. A reason may be, for example, that the data base system encounters an unresolvable error or that a connection between the system and a data base server is interrupted. A further reason may be that the user may cancel the transaction preventing the system to change the atomic unit 2. In such cases, the system 100 may roll back partial changes of the atomic unit 1 that have already been executed and may even have been committed on the level of the data base table.

Figure 5:
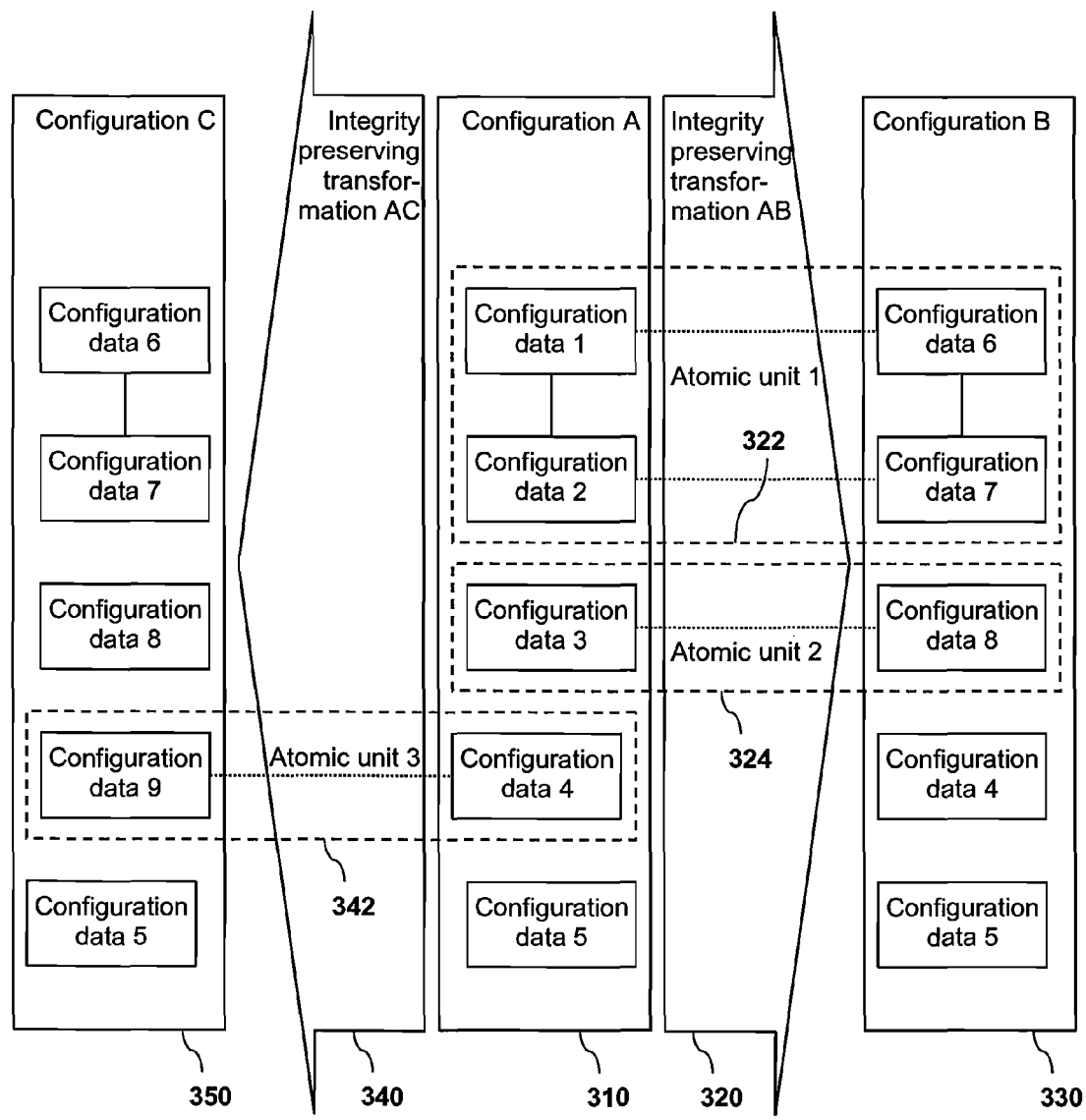
FIG. 5 is a diagram of two example independent changes of configurations using integrity providing transformations.

FIG. 5 is a diagram of two example independent changes of configurations using integrity providing transformations. The first change from configuration A 310 is executed using the integrity preserving transformation AB 320 to reach configuration B 330. A second change from the configuration A is executed using a second integrity preserving transformation AC 340 to reach configuration C 350. The integrity preserving transformation AC includes an atomic unit 3 342 that has a partial change of configuration data 4 to configuration data 9.

The integrity preserving transformation AB may be terminated prior to the integrity preserving transformation AC. This is why configuration C includes configuration data 6, configuration data 7, and configuration data 8 that are a result of the integrity preserving transformation AB.

In the example shown in FIG. 5, it may be that two different users change the configuration concurrently. A first user may request a change from configuration A to configuration B, and a second user may use the system 100 to change the configuration A to configuration C. Both of the users may be provided, for example, with an EPC diagram that represents configuration A. The first user may finish first requesting the change and accordingly integrity preserving transformation AB may be finished first. The second user may continue to work on the configuration state representing configuration A and may then create a request to change the configuration.

The integrity preserving transformation AC 340 may be able to reach configuration C because the integrity preserving transformation AB and the integrity preserving transformation AC are independent (e.g., the two integrity preserving transformations include independent partial changes). Furthermore, configuration C includes changes of the integrity preserving transformation AB because the integrity preserving transformation AB has terminated prior to the integrity preserving transformation AC. In other words, the result of the integrity preserving transformation AB is transparent and may be a part of the configuration C. In a further example, a second integrity preserving transformation may not be independent of a first integrity preserving transformation. In such a case, partial changes of the second integrity preserving transformation may be rolled back completely because the second integrity preserving transformation may not be executable as desired.

The example shown in FIG. 5 may arise frequently when more than one user configures for example an ERP program. This may be the case when a large implementation project is done that has more than one project member responsible for configuring. In such a case, the system may enable a project team to work in parallel and therefore to work more efficiently. The project team may be able to rely on parallel changes of the configuration that are independent are executed in a secure way and that changes of the configuration that are dependent are treated so that consistency is preserved. In a further example, many changes may be entered to a further system. The further system may collect such changes and send them to the system for changing the configuration in one file. The file may therefore include independent changes that may be processed by the system in an efficient way by allowing for parallel or simultaneous changes.

Figure 6:
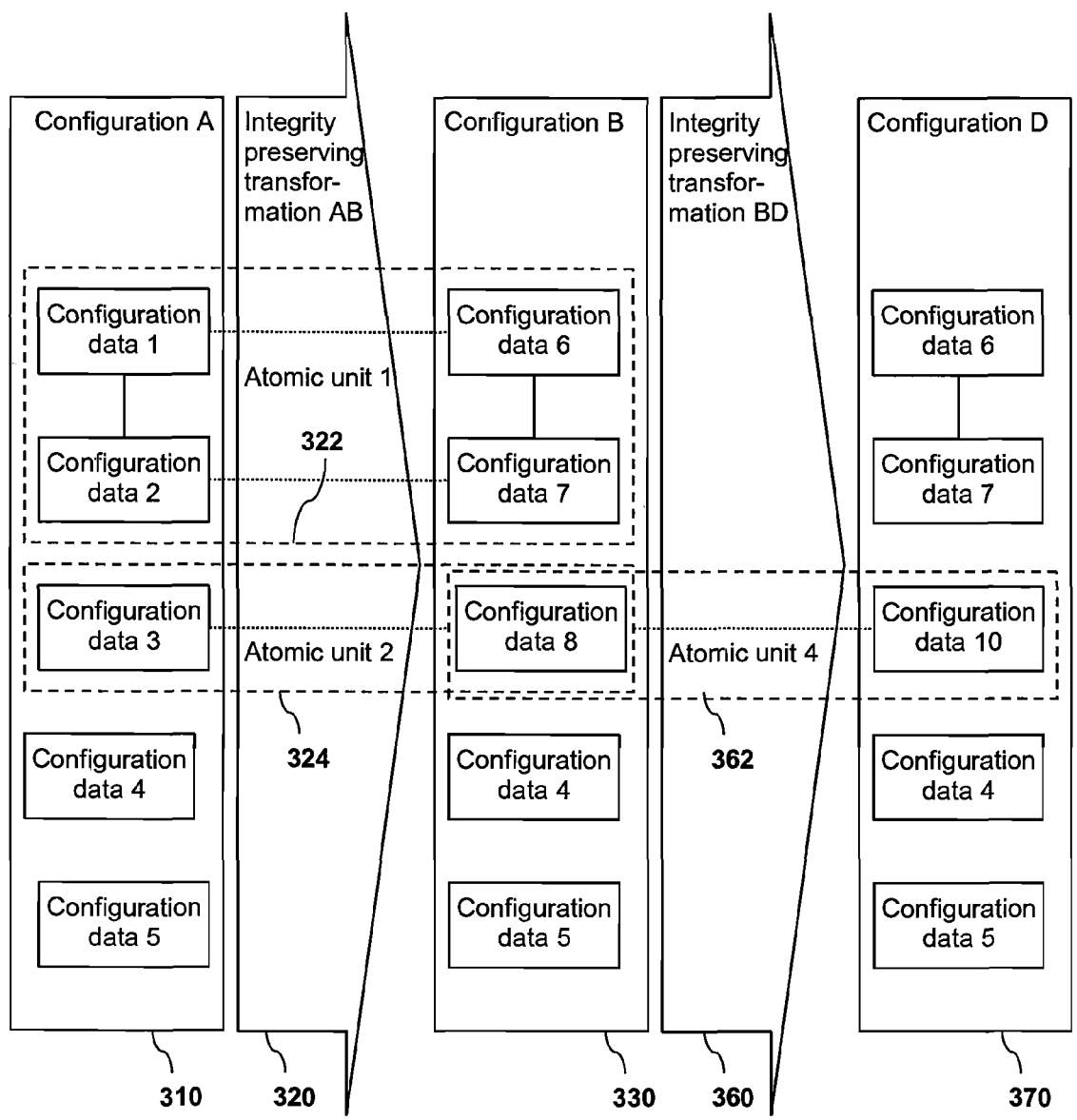
FIG. 6 is a diagram of two example sequential changes of configurations using integrity providing transformations.

FIG. 6 is a diagram of two example sequential changes of configurations using integrity providing transformations. The first integrity preserving transformation AB is terminated and followed by an integrity preserving transformation BD 360 to reach configuration D 370.

The integrity preserving transformation BD is dependent on the integrity preserving transformation AB because an atomic unit 4 362 includes a partial change of the configuration data 8 that is a result of the partial change of the configuration data 3. Such dependent integrity preserving transformations may be done when the integrity preserving transformation AB is terminated and the result is transparent to further transactions for changing the configuration. This may include updating the configuration state that represents configuration A to the further configuration state that represents the configuration B. Therefore, a user being provided with the updated configuration state may request changes that lead to the integrity preserving transformation BD.

Figure 7:
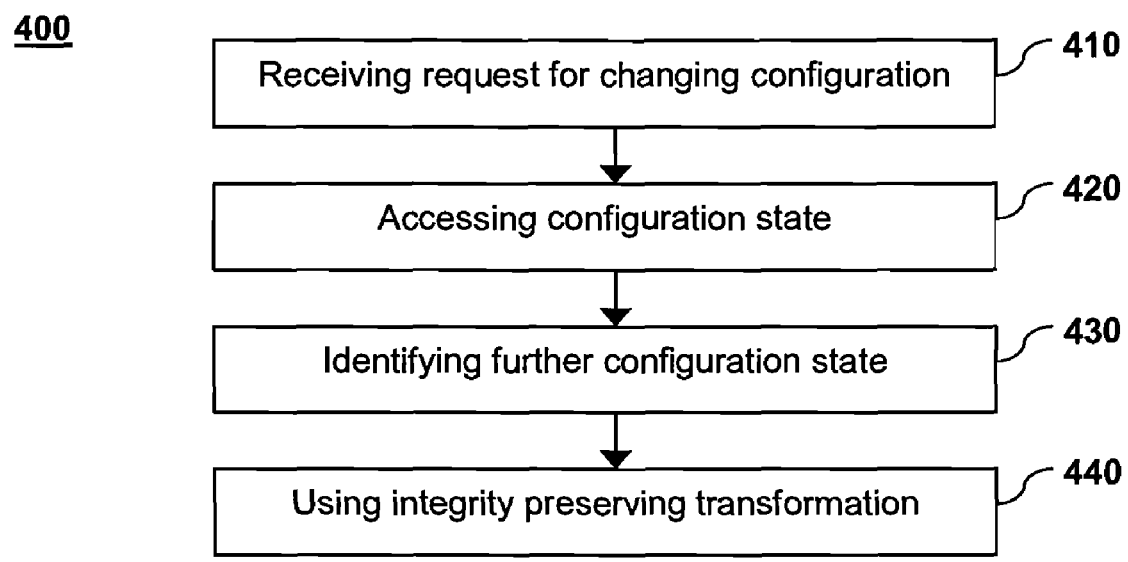
FIG. 7 is a simplified flow diagram of an example embodiment.

FIG. 7 is a simplified flow diagram of an example embodiment. The example embodiment is an example computer-implemented method 400 for changing a configuration of an application program. The example method includes operations receiving 410 the request for changing the configuration and accessing 420 the configuration state that represents the configuration. Operations of the method 400, such as receiving 410 the request and accessing 420 the configuration state may also be executed in a different order. In a further example, it may be that the configuration state is accessed when a user enters an interactive program for changing the configuration of the application program. The method 400 further includes identifying 430 the further configuration state that is consistent with the system of rules and that represents a further configuration that complies with the request, and using 440 the integrity preserving transition to change the configuration to the further configuration.

As a first optional feature, the configuration states may represent processes of the application program and may have elements that represent operations of the processes. As a second optional feature, the system of rules may include semantic rules for relating elements of the configuration states. As a third optional feature the system of rules may include syntactic rules for relating elements of the configuration states. Furthermore, the system of rules may include any one of the following formal languages providing a syntax: EPC, Petri nets, YAWL.

In an example, the first optional feature and the second optional feature may be combined to a further method. In the further method, identifying the further configuration state may include checking in a first stage that elements of the further configuration state are consistent with semantic rules of the system of rules. This may be done by at least one of adding content to and eliminating content from the process represented by the configuration state to obtain an intermediate configuration state. In the further method, identifying the further configuration state may include checking in a second stage that the elements of the further configuration state are consistent with syntactic rules of the system of rules by at least one of adding elements to and eliminating elements from the intermediate configuration state to obtain the further configuration state.

As a fourth optional feature, the integrity preserving transition may roll back one or more partial changes of the configuration when a further partial change of the configuration fails. As a fifth optional feature, the integrity preserving transition may change the configuration in atomic units that comprise one or more partial changes. As a sixth optional feature, the integrity preserving transition may include partial changes that are independent of further partial changes of a further integrity preserving transformation for changing the configuration. As a seventh optional feature, a following integrity preserving transition may change the further configuration to a further following configuration following a termination of the integrity preserving transition.

Optional features of the example method may also be combined independently with each other to define further example methods. Furthermore, optional features of the example method may correspond to optional features of an example system for changing the configuration. Accordingly, the corresponding optional features of the example system may also be combined independently to give further example implementations of the system.

Figure 8:
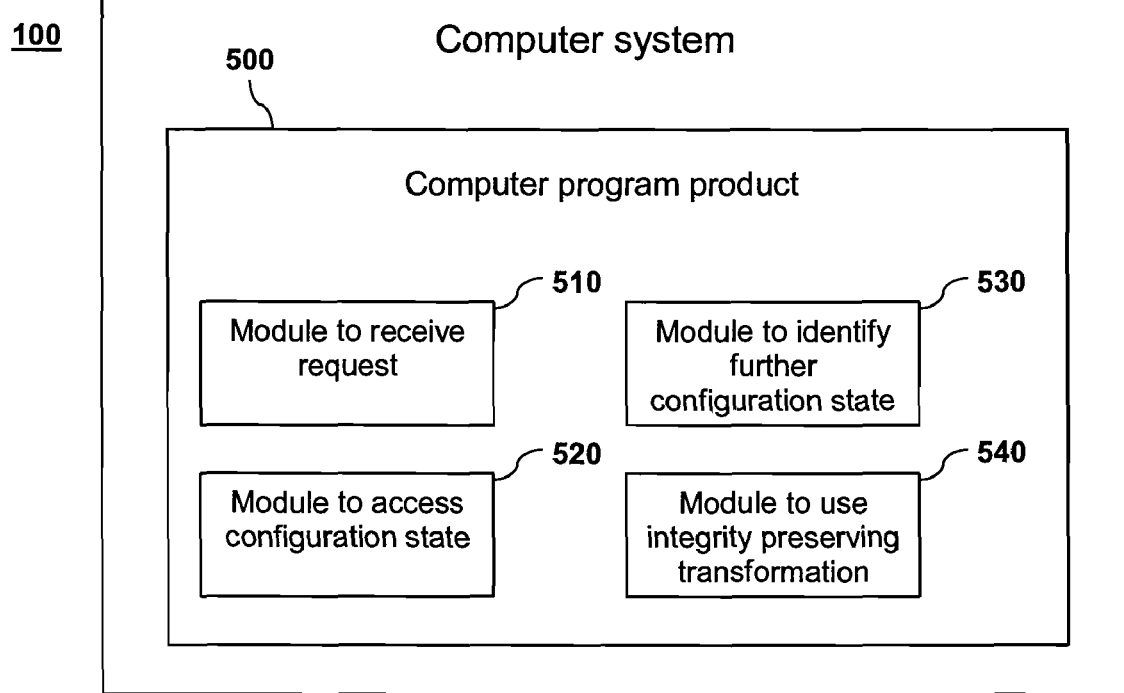
FIG. 8 is a block diagram illustrating a software architecture, according to an example embodiment.

FIG. 8 is a block diagram illustrating a software architecture, according to an example embodiment. The example embodiment includes the computer system 100 with a computer program product 500. The computer system 100 may have hardware components or units that have been described in a previous figure. In FIG. 8 software components of the system 100 are illustrated using the block diagram with the software architecture.

The computer program product 500 may have instructions that may be grouped into modules. The computer program product may include a module 510 to receive the request to change the configuration of the application program. The computer program product may include a module 520 to access the configuration state that represents the configuration of the application program. The computer program product may include a module 530 to identify the further configuration state that is consistent with the system of rules and that represents the further configuration complying with the request. The computer program product may include a module 540 to use an integrity preserving transition to change the configuration to the further configuration.

The computer system 100 may include the computer program product 500 so that the computer system 100 may be able to execute instructions of the computer program product 500. Instructions of the computer program product may be distributed in the computer system. In an example, instructions of a module may be a part of one or more hardware components of the system. More specifically, a part of the module may be stored in the storage unit 130 (see FIG. 1) and a further part of the module may be processed by the processing unit 120. It may also be that all modules are stored in the storage unit to which they have been transferred from a storage medium such as a compact disc (CD).

The computer program product 500 may be related to a method that is in accordance to an embodiment. The computer program product 500 may include instructions for the computer system 100 and may be configured to cause the computer system to execute method operations according to the method. The method operations may be according to the method having any combination of the optional features, possibly also without any of the optional features.

As noted above, example embodiments within the scope of the present invention include computer program products. The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is an example of a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer-executable instructions into the executable format and a second computer may execute the transformed instructions.

Example embodiments have been described in the general context of method operations, which may be implemented in one embodiment by a computer program product including computer-executable instructions, such as program code, executed by computers in networked environments. Computer-executable instructions may be grouped in modules or program modules. Generally, program modules include for example routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such operations.

Some embodiments may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, hardware implementations, or equipment for receiving manual inputs.

The invention claimed is:

1. A system comprising:
    a communication unit to receive a request to change a configuration of an application program;
    a storage unit to access a configuration state that represents the configuration of the application program; and
    a processing unit
        to identify a further configuration state that is consistent with a system of rules and represents a further configuration that complies with the request, the system of rules including rules that describe at least one relationship between elements of the configuration state and being used to check one or more criteria that the configuration state should fulfill for consistency; and
        to perform an integrity preserving transition to change the configuration to the further configuration, the integrity preserving transition terminating with the further configuration when the integrity preserving transition changes the configuration.

2. The system of claim 1, wherein the configuration state and the further configuration state represent processes of the application program and have elements that represent operations of the processes.

3. The system of claim 2, wherein the system of rules comprises semantic rules for relating elements of configuration states, the semantic rules being rules that apply to content of the configuration.

4. The system of claim 2, wherein the system of rules comprises syntactic rules for relating elements of configuration states, the syntactic rules being rules that apply to one or more elements of the configuration state.

5. The system of claim 4, wherein the system of rules comprises any one of the following formal languages for describing a workflow: event-driven process chains, Petri nets, and yet another workflow language.

6. The system of claim 1, wherein the integrity preserving transition rolls back one or more partial changes of the configuration when a further partial change of the configuration fails.

7. The system of claim 1, wherein the integrity preserving transition changes the configuration in atomic units that comprise one or more partial changes, each partial change of an atomic unit being related by the system of rules to a further partial change of the atomic unit when the atomic unit comprises more than one partial change.

8. The system of claim 1, wherein the integrity preserving transition comprises partial changes that are independent of further partial changes of a further integrity preserving transformation for changing the configuration.

9. The system of claim 1, wherein a following integrity preserving transition changes the further configuration to a further following configuration following a termination of the integrity preserving transition.

10. A method comprising:
    receiving a request to change a configuration of an application program;
    accessing a configuration state that represents the configuration of the application program;
    identifying a further configuration state that is consistent with a system of rules and that represents a further configuration that complies with the request, the system of rules including rules that describe at least one relationship between elements of the configuration state and being used to check one or more criteria that the configuration state should fulfill for consistency; and
    using a processor to perform an integrity preserving transition to change the configuration to the further configuration, the integrity preserving transition terminating with the further configuration when the integrity preserving transition changes the configuration.

11. The method of claim 10, wherein the configuration state and the further configuration state represent processes of the application program and have elements that represent operations of the processes.

12. The method of claim 11, wherein the system of rules comprises semantic rules for relating elements of configuration states, the semantic rules being rules that apply to content of the configuration.

13. The method of claim 11, wherein the system of rules comprises syntactic rules for relating elements of configuration states, the syntactic rules being rules that apply to one or more elements of the configuration state.

14. The method of claim 13, wherein the system of rules comprises any one of the following formal languages for describing a workflow: event-driven process chains, Petri nets, yet another workflow language.

15. The method of claim 11, wherein identifying the further configuration state comprises checking in a first stage that elements of the further configuration state are consistent with semantic rules of the system of rules by at least one of adding content to and eliminating content from the process represented by the configuration state to obtain an intermediate configuration state and checking in a second stage that the elements of the further configuration state are consistent with syntactic rules of the system of rules by at least one of adding elements to and eliminating elements from the intermediate configuration state to obtain the further configuration state.

16. The method of claim 10 wherein the integrity preserving transition rolls back one or more partial changes of the configuration when a further partial change of the configuration fails.

17. The method of claim 10 wherein the integrity preserving transition changes the configuration in atomic units that comprise one or more partial changes, wherein each partial change of an atomic unit is related by the system of rules to a further partial change of the atomic unit when the atomic unit comprises more than one partial change.

18. The method of claim 10 wherein the integrity preserving transition comprises partial changes that are independent of further partial changes of a further integrity preserving transformation for changing the configuration.

19. The method of claim 10 wherein a following integrity preserving transition changes the further configuration to a further following configuration following a termination of the integrity preserving transition.

20. A non-transitory machine-readable storage medium storing instructions, which when executed by at least one processor, performs operations comprising
    receiving a request to change a configuration of an application program;
    accessing a configuration state that represents the configuration of the application program;
    identifying a further configuration state that is consistent with a system of rules and that represents a further configuration that complies with the request, the system of rules including rules that describe at least one relationship between elements of the configuration state and being used to check one or more criteria that the configuration state should fulfill for consistency; and using an integrity preserving transition to change the configuration to the further configuration, the integrity preserving transition terminating with the further configuration when the integrity preserving transition changes the configuration.

* * * * *